(12) United States Patent
Marchand et al.

(10) Patent No.: US 12,402,192 B2
(45) Date of Patent: Aug. 26, 2025

(54) METHOD FOR MANAGING COMMUNICATION BETWEEN A CONTROL DEVICE AND A READING TERMINAL

(71) Applicant: Orange, Issy-les-Moulineaux (FR)

(72) Inventors: Hervé Marchand, Chatillon (FR); Mathieu Rivoalen, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 466 days.

(21) Appl. No.: 17/529,879

(22) Filed: Nov. 18, 2021

(65) Prior Publication Data

US 2022/0167455 A1 May 26, 2022

(30) Foreign Application Priority Data

Nov. 25, 2020 (FR) ...................................... 2012118

(51) Int. Cl.
*H04W 76/20* (2018.01)
(52) U.S. Cl.
CPC .................................. *H04W 76/20* (2018.02)
(58) Field of Classification Search
CPC ...... H04N 21/40; H04N 21/41; H04N 21/422; H04N 21/42204; H04N 21/42206; H04W 76/20; G06F 9/4418; G06F 1/3203
See application file for complete search history.

(56) References Cited

U.S. PATENT DOCUMENTS

| 8,528,012 | B2 * | 9/2013 | Zeleznikar | H04N 21/4316 |
| | | | | 348/569 |
| 9,392,320 | B1 * | 7/2016 | Damle | H04N 21/4424 |
| 9,998,786 | B2 | 6/2018 | Juan | |
| 2003/0046689 | A1 * | 3/2003 | Gaos | H04N 21/42203 |
| | | | | 715/745 |

(Continued)

FOREIGN PATENT DOCUMENTS

JP 2012161038 A 8/2012

OTHER PUBLICATIONS

French Search Report and Written Opinion dated Aug. 27, 2021 for corresponding French Application No. 2012118, filed Nov. 25, 2020.

(Continued)

*Primary Examiner* — Atique Ahmed
(74) *Attorney, Agent, or Firm* — David D. Brush; Westman, Champlin & Koehler, P.A.

(57) ABSTRACT

A method for managing communication between a control device, called a first control device, and a reading terminal that are able to communicate with one another via a first communication link. The first control device is able to communicate with the reading terminal when a communication session is active on the first communication link. The reading terminal is connected, via a second communication link, to a rendering device having a plurality of operating states and able to render content depending on its operating state. The method of managing includes the following steps (Continued)

in the reading terminal: obtaining an item of data representative of a modification of the operating state of the rendering device, and a step of requesting modification of the state of the session between the reading device and the first control device on the basis of the obtained item of data.

6 Claims, 2 Drawing Sheets

(56) References Cited

U.S. PATENT DOCUMENTS

| | | | |
|---|---|---|---|
| 2006/0053444 A1* | 3/2006 | Rudolph | H04N 21/426 |
| | | | 348/E5.103 |
| 2008/0098426 A1* | 4/2008 | Candelore | H04N 21/47 |
| | | | 348/E5.103 |
| 2009/0249086 A1 | 10/2009 | Reams | |
| 2012/0136217 A1* | 5/2012 | Cheung Hyen | A61B 5/72 |
| | | | 600/300 |
| 2015/0095930 A1* | 4/2015 | Roberts | H04N 21/4828 |
| | | | 725/18 |
| 2015/0135206 A1* | 5/2015 | Reisman | H04H 20/93 |
| | | | 725/18 |
| 2020/0128289 A1* | 4/2020 | Machida | H04N 21/42225 |
| 2020/0363852 A1* | 11/2020 | Choi | G08C 23/04 |

OTHER PUBLICATIONS

Ltd Hitachi, "High-Definition Multimedia Interface Specification Version 1.3a", Nov. 10, 2006 (Nov. 10, 2006), XP055113810.

* cited by examiner

[Fig. 1]
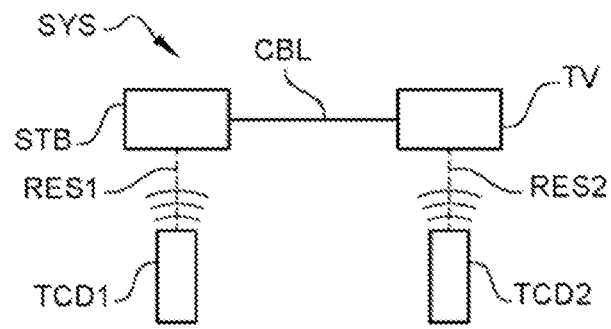
[Fig. 2]
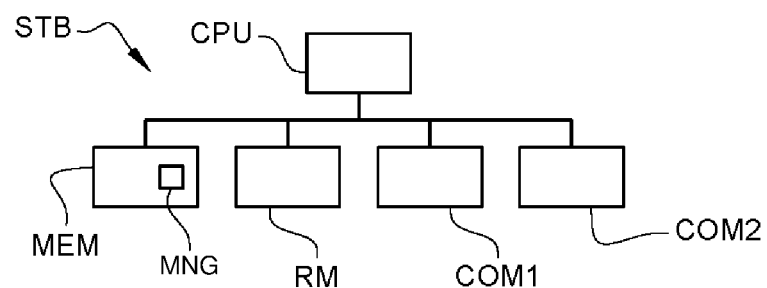
[Fig. 3]
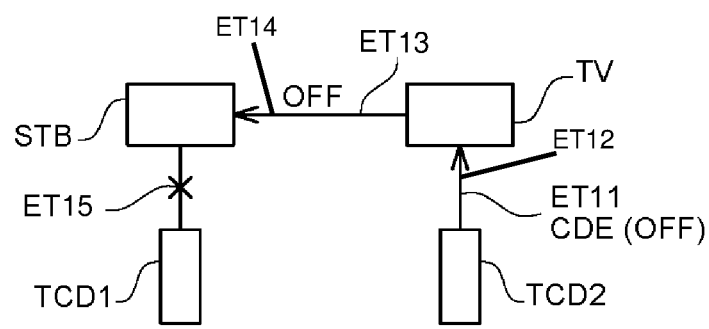

[Fig. 4]
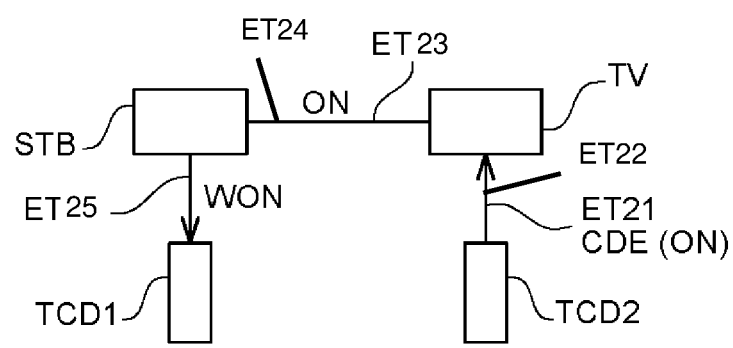
[Fig. 5]
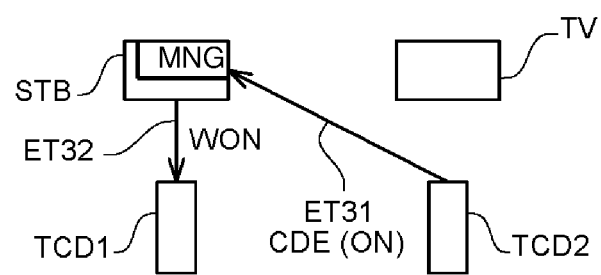

METHOD FOR MANAGING COMMUNICATION BETWEEN A CONTROL DEVICE AND A READING TERMINAL

TECHNICAL FIELD

The invention relates to a method for managing communication between a control device and a reading terminal.

The reading device targets a device able to access multimedia content locally or via a communication network. The reading device is controlled by a control device.

The control device targets a device used to manipulate another device remotely, via a cable, via infrared, radio waves, etc. The manipulation is performed through a set of commands available on the control device. The control device used hereinafter to illustrate the invention will be a remote control.

A remote control may be a physical and/or software resource. A physical remote control is typically a module able to control a device, illustrated by way of a data receiver in the remainder of the description. A software remote control is for example a human-machine interface offered by way of a computing application; this type of interface is available for displaying content on a computer; indeed, an increasing amount of content (VOD, TVOD) is able to be read on a computer, tablet or similar devices.

PRIOR ART

Modern remote controls are generally wireless and are supplied with electric power by an energy source such as batteries, battery cells, etc.

Communication protocols able to be used nowadays, for example the Bluetooth protocol, consume a great deal of energy. The service life of batteries is greatly reduced. The premature wear of batteries is inconvenient for three main reasons. A first reason is that the user has to change the batteries frequently; This change requires a manual operation that is undesirable for some people, in particular elderly people. A second reason is ecological; the number of used batteries is increasing exponentially. A third reason is the high monetary cost of batteries.

This excessive energy consumption is down to the fact that Bluetooth remote controls operate in connected mode. This connected mode requires keeping an active Bluetooth session between the remote control and the equipment to be controlled, so as to transmit commands from the remote control to the equipment to be controlled at any time.

It is therefore important to very finely manage the electricity consumption of a remote control in order to guarantee an optimum service life of the energy source, more often than not batteries, present in the remote control.

There are therefore some mechanisms that deactivate the session after a certain inactivity time of the user. For example, if the user does not press a button of the remote control for a few minutes, then said remote control automatically closes the Bluetooth session in order to limit energy consumption.

However, it is important not to close the Bluetooth session too early for at least the following two reasons.

A first reason is that establishing a new session leads to a consumption peak as it requires a large amount of energy; repetitive peaks linked to disconnections/reconnections inevitably cause premature wear of batteries.

A second reason is that the time to re-establish a Bluetooth session is not instantaneous and takes a few hundred milliseconds, which may be perceptible to the user. The user may thus, when the remote control is in standby, press a button and have the impression that this action is not taken into account by the equipment being controlled.

Modern remote controls that require a communication session with the equipment to be controlled therefore have to be optimized in order to close the session at the correct time when the user no longer needs to use the equipment being controlled, but not too early as re-establishing the session consumes a large amount of energy and takes a time that is perceptible to the user.

The invention aims to improve the situation.

THE INVENTION

To this end, the invention relates to a method for managing communication between a control device, called first control device, and a reading terminal that are able to communicate with one another via a first communication link, the first control device being able to communicate with the reading terminal when a communication session is active on the first communication link, the reading terminal being connected, via a second communication link, to a rendering device having a plurality of operating states and able to render content depending on its operating state, wherein it comprises the following steps in the reading terminal:
  a step of obtaining an item of data representative of a modification of the operating state of the rendering device,
  a step of requesting modification of the state of the session between the reading device and the first control device on the basis of the obtained item of data.

The state of the session between the reading terminal and the control device becomes dependent on the operating state of the rendering device. This dependence makes sense as the operating state of the rendering device, which is controlled independently of the reading device, for example via a second control device, is often linked to an explicit action of the user who wishes for example to stop the rendering. To this end, the user explicitly presses a button of the second control device to stop the rendering of the content. The probability of the user turning the rendering device back on following stoppage of the rendering device within a short time interval is therefore extremely low; the invention therefore guarantees a long enough time interval between the closure of the session and any re-establishment of the session. The invention avoids repetitive session closures and re-establishments that consume a very large amount of energy and that require a waiting period that is often perceptible to the user. The solution is therefore highly advantageous in terms of saving energy and user experience.

Furthermore, by virtue of the invention, the session is re-established even before the user transmits a command to the reading terminal via the first control device. By virtue of the invention, the time to re-establish the Bluetooth session is no longer perceptible to the user, since the re-establishment has already started, or even ended, even before a command is transmitted by the first control device to the reading device.

According to a first particular mode of implementation of the invention, the step of obtaining the item of data representative of a modification of the operating state of the rendering device includes a step of receiving commands from the second remote control and of detecting commands that change the operating state of the reading device. Detecting a request to modify the operating state of the rendering device in this case targets an intention to change the operating state of the rendering device, the command from the second device not yet at this stage having been executed by the rendering device. This mode has the advantage of detecting a change in operating state of the rendering device even before the rendering device executes the command transmitted by the second remote control and the rendering device effectively changes operating state.

According to a second particular mode of implementation of the invention, which may be implemented as an alternative or in addition to the previous one, if the operating state of the rendering device prevents content from being rendered, the modification consists in closing the communication session between the reading terminal and the first control device. This first mode targets a modification that closes the session, for example as soon as the rendering device is turned off or enters a standby state.

According to a third embodiment of the invention, which may be implemented as an alternative or in addition to the previous ones, if the modification of the operating state is a change to a state in which the rendering device is able to render content, the modification consists in establishing the session. This third embodiment targets establishing a session as soon as the rendering device is turned on.

According to one variant of the third embodiment, re-establishing the session comprises transmitting a wake-up command to the control device.

According to one hardware aspect, the invention relates to a management entity for managing communication between a control device, called first control device, and a reading terminal that are able to communicate with one another via a first communication link, the control device being able to communicate with the reading terminal when a communication session is active on the first communication link, the reading terminal being connected, via a second communication link, to a rendering device having a plurality of operating states and able to render content depending on its operating state, wherein it comprises
    a module for obtaining an item of data representative of a modification of the operating state of the rendering device,
    a module for requesting modification of the state of the session between the reading device and the control device on the basis of the obtained item of data.

According to another hardware aspect, the invention relates to a computer program able to be implemented in a management entity such as defined above, said program comprising code instructions that, when the program is executed, perform the step defined in the method defined above.

According to another hardware aspect, the invention relates to a recording medium able to be read by a data processor and on which there is recorded a program comprising program code instructions for executing the steps of the method defined above.

It will be pointed out here that the data medium may be any entity or device capable of storing the program. For example, the medium may comprise a storage means, such as a ROM, for example a CD-ROM or a microelectronic circuit ROM, or else a magnetic recording means, or a hard disk. Moreover, the information medium may be a transmissible medium such as an electrical or optical signal, which may be routed via an electrical or optical cable, by radio or by other means. The program according to the invention may in particular be downloaded from an Internet network. As an alternative, the information medium may be an integrated circuit into which the program is incorporated, the circuit being designed to execute or to be used in the execution of the method in question.

The invention will be better understood on reading the following description, which is given by way of example and with reference to the appended drawings, in which:

FIG. 1 shows a computing system on which one exemplary embodiment of the invention is illustrated.

FIG. 2 is a schematic view of the circuits present in the reading terminal.

FIG. 3 is a schematic view of the steps implemented according to a first embodiment of the invention.

FIG. 4 is a schematic view of the steps implemented according to a second embodiment of the invention.

FIG. 5 is a schematic view of the steps implemented according to a variant of the first and second embodiments of the invention.

Detailed description of one exemplary embodiment illustrating the invention:

FIG. 1 shows a system SYS comprising a control device, for example a remote control TCD1, hereinafter called first remote control, able to control a reading terminal STB.

The first remote control TCD1 conventionally includes a processor, a storage module for storing data and at least one control element, such as control buttons (also called key codes), for example located on one of the faces of the remote control. The modules and control elements, and also the processor, are supplied with power by an electrical energy source, such as a battery or a battery cell. The installed modules and control elements are connected to one another via a bus. It will be recalled that a bus has the role of transferring digital data between the various circuits of a computer. In our example, the bus in question includes a data bus and a control bus.

The reading terminal STB is connected to a rendering device TV able to render content. In our example, the rendering device is a television set TV, but could very well be a simple screen, a speaker, etc.

The rendering device has a plurality of operating states. These operating states may be controlled from a control device, for example a remote control TCD2, hereinafter called second remote control.

The control devices may, indiscriminately, be integrated into the device with which they are associated or located remotely in the case of a remote control. In our example, the second control device TCD2 is similar to the first remote control TCD1. This second remote control TCD2 communicates with the rendering device TV via a second communication link RES2.

There are at least two operating states of a rendering device TV. The most common operating states are
    a normal operating state in which the rendering device is ready to render content;
    a standby state or a turned-off state that require a wake-up command and a power-on command, respectively, to render content.

We will limit ourselves to these two states for the disclosure of the invention. Other states are of course possible.

The content may be stored in a memory of the reading terminal STB or on a data medium, such as a DVD inserted into the reading terminal.

The content may also be stored in a remote device connected to the reading terminal STB, for example via an Internet network. In this configuration, the reading terminal STB accesses the requested content via the Internet network, for example via a home gateway (not shown in the figures). The gateway GTW is typically a Livebox® home gateway.

The connection between the decoder STB and the television set TV is arbitrary; for example, the connection between the decoder and the television set is an HDMI cable, an Ethernet cable or any other equivalent cable.

The connection between the decoder STB and the gateway is also arbitrary, for example an Ethernet link or a Wi-Fi network.

In our example, the content is multimedia content stored remotely on a service platform that delivers for example multimedia content such as television channels, television films on demand (VOD), etc.

In our example, the first remote control TCD1 is able to control the decoder STB directly without any intermediary. To this end, the first remote control TCD1 communicates with the decoder STB via a first, short-range communication link RES1, such as for example a Bluetooth, ZigBee, Wi-Fi, etc. connection. The first remote control TCD1 and the decoder STB are equipped with respective communication modules.

A session may be ongoing or closed; reference will be made hereinafter to active or inactive session, respectively. As will be explained below, communication is possible between the decoder STB and the first remote control TCD1 only when a communication session is active. In other words, sending a command from the first remote control TCD1 to the decoder STB requires a session to be active (established) between the first remote control TCD1 and the decoder STB.

In general, a communication session is inactive when the first remote control TCD1 and/or the decoder STB change/changes to a standby state or are/is turned off. It will be recalled that a standby state may for example follow a period of inactivity of the user.

When the first remote control TCD1 is in a standby state, sending a command from the first remote control TCD1 requires re-establishing a session between the first remote control TCD1 and the decoder STB.

With reference to FIG. 2, consideration will now be given to the simplified structure of the decoder STB according to one exemplary embodiment of the invention. Such a decoder STB is designed to implement the method for managing communication between the decoder STB and first remote control TCD1.

The decoder STB comprises physical and/or software resources, specifically memories associated with a processor CPU. The memories may be ROMs (Read-Only Memory) or RAMs (Random Access Memory) or even flash memories.

The decoder STB furthermore comprises a processing circuit for implementing the method for managing communication between the decoder STB and the first remote control TCD1 according to various embodiments of the invention, the processing circuit comprising a processor CPU driven by a management entity ENT, in our example a computer program, stored in a read-only memory MEM, the entity MNG being able to implement the management method.

On initialization, the code instructions of the computer program PGM are for example loaded into a RAM memory, referenced MR, before being executed by the processor CPU.

The decoder STB primarily comprises:
a communication interface COM1 that is designed to receive commands from the first remote control TCD1;
a communication interface COM2 that is designed to exchange data with a remote server so as to receive multimedia content, specifically, as the usage case may be, television channels and/or videos and/or online games, etc.

The communication interfaces COM1, COM2 and the management entity MNG are driven by the processor PRO of the processing circuit.

As indicated above, the rendering device TV may have a plurality of operating states. Depending on its state, the rendering device TV may or may not render multimedia content. For example, if the rendering device TV is inactive (turned off or in standby), it is not able to render content in this state; by contrast, if it is active, the rendering device TV is able to perform rendering.

The invention proposes to detect a modification of the operating state of the rendering device, and to modify the state of the session between the first remote control TCD1 and the decoder STB on the basis of the detected operating state of the rendering device TV.

FIG. 3 illustrates a first embodiment of the method of the invention.

In this FIG. 3, it is considered that:
a session is active between the decoder STB and the first remote control TCD1;
the rendering device TV is in a normal operating state, that is to say that the screen is ready to receive multimedia content to be displayed thereon.

The steps are as follows:

In a first step ET11, the user uses the second remote control TCD2 to command powering off of the rendering device TV.

In a second step ET12, the rendering device TV receives the command and executes the command.

In a third step ET13, the rendering device TV transmits, to the decoder STB, an item of data referenced OFF representative of the new operating state of the rendering device TV. This item of data may be transmitted by way of the HDMI CEC (abbreviation for Consumer Electronics Control) protocol, which is known to a person skilled in the art.

In a fourth step ET14, the decoder STB receives the item of data OFF from the rendering device TV.

In a fifth step ET15, the decoder STB, following the reception, closes the ongoing session. The closure may be preceded by a message from the decoder STB to the first remote control TCD1 informing the first remote control of the closure of the session. Following the reception of the message, the first remote control TCD1 may be put into standby.

FIG. 4 illustrates a second embodiment of the method of the invention.

In this FIG. 4, it is considered that:
a session is inactive between the decoder STB and the first remote control TCD1;
the rendering device TV is in an operating state (for example in standby or turned off) in which a display requires an action.

The steps are as follows:

In a first step ET21, the user uses the second remote control TCD2 to command powering on of the rendering device TV.

In a second step ET22, the rendering device TV receives the command and executes the command.

At this stage, the rendering device TV is powered on.

In a third step ET23, the rendering device TV transmits, to the decoder STB, an item of data referenced ON representative of the new operating state of the rendering device TV. This item of data may again be transmitted by way of the HDMI CEC (abbreviation for Consumer Electronics Control) protocol, which is known to a person skilled in the art.

In a fourth step ET24, the decoder STB receives the item of data ON from the rendering device TV.

In a fifth step ET25, the decoder STB, following the reception of the item of data ON, transmits a message to the first remote control TCD1 to modify its operating state. The first remote control TCD1 then changes from the standby state to a normal operating state. Following this change, a communication session is activated between the decoder STB and the first remote control TCD1. The message for waking the first remote control TCD1 is for example the message "Wake On Bluetooth" known to a person skilled in the art.

The two embodiments described above, which may be implemented on their own or in combination, may be subject to variants.

According to one variant, illustrated in FIG. 5, the rendering device TV is controlled via the remote control TCD2. In this configuration, the step of obtaining the item of data representative of a modification of the operating state of the rendering device includes a step ET31 of receiving commands CDE(ON) from the second remote control TCD2. The management module MNG intercepts the commands transmitted by the second remote control CD2 that are intended for the rendering device TV. The reading device STB then detects, from among the intercepted commands, the commands that change the state of the reading device.

If an intercepted command from the second remote control TCD2 changes the operating state of the rendering device TV, the management model MNG performs step ET15 or ET25 depending on the current operating state of the rendering device TV. In our example, in FIG. 5, the decoder STB, following the reception, transmits, in a second step ET32 (step ET25), a message to the first remote control TCD1 to modify its operating state. The first remote control TCD1 then changes from the standby state to a normal operating state. Following this change, a communication session is activated between the decoder STB and the first remote control TCD1.

Lastly, it should be pointed out here that, in the present text, the term "module" may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention claimed is:

1. A method for managing communication between a first control device and a reading terminal that are able to communicate with one another via a first communication link, the first control device being able to communicate with the reading terminal when a communication session is active on the first communication link, the reading terminal being connected, via a second communication link, to a rendering device having a plurality of operating states and able to render content depending on a current operating state of the plurality of operating states of the rendering device, the rendering device being controlled via a second control device wherein the method is implemented by the reading terminal and comprises:

obtaining an item of data representative of a modification of the current operating state of the rendering device, the obtaining of the item of data representative of the modification of the current operating state of the rendering device including intercepting commands transmitted from the second control device to the rendering device for controlling the rendering device and detecting commands that change the state of the rendering device; and requesting modification of a state of the communication session between the reading terminal and the first control device on the basis of the obtained item of data.

2. The management method as claimed in claim 1, wherein, in response to the current operating state of the rendering device preventing content from being rendered, the modification of the state of the communication session comprises closing the communication session between the reading terminal and the control device.

3. The management method as claimed in claim 1, wherein, in response to the modification of the current operating state of the rendering device being a change to a state in which the rendering device is able to render content, the modification of the state of the communication session comprises establishing the session.

4. A management entity for managing communication between a first control device and a reading terminal that are able to communicate with one another via a first communication link, the first control device being able to communicate with the reading terminal when a communication session is active on the first communication link, the reading terminal being connected, via a second communication link, to a rendering device having a plurality of operating states and able to render content depending on a current operating state of the plurality of operating states of the rendering device, the rendering device being controlled via a second control device, wherein the management entity comprises:

a processor; and a non-transitory computer-readable medium comprising program code instructions which when executed by the processor configure the management entity to:

obtain an item of data representative of a modification of the current operating state of the rendering device, the obtaining of the item of data representative of the modification of the current operating state of the rendering device including intercepting commands transmitted from the second control device to the rendering device for controlling the rendering device and detecting commands that change the state of the rendering device; and request modification of a state of the communication session between the reading terminal and the first control device on the basis of the obtained item of data.

5. The management entity as claimed in claim 4, wherein the management entity is implemented in the reading terminal.

6. A non-transitory computer-readable recording medium on which there is recorded a program comprising program code instructions for executing a method for managing communication between a first control device and a reading terminal that are able to communicate with one another via a first communication link, when the instructions are executed by a data processor of the reading terminal, the first control device being able to communicate with the reading terminal when a communication session is active on the first communication link, the reading terminal being connected, via a second communication link, to a rendering device having a plurality of operating states and able to render content depending on a current operating state of the plurality of operating states of the rendering device, the rendering device being controlled via a second control device, wherein the method is implemented by the reading terminal and comprises:

obtaining an item of data representative of a modification of the current operating state of the rendering device, the obtaining of the item of data representative of the modification of the current operating state of the rendering device including intercepting commands transmitted from the second control device to the rendering device for controlling the rendering device and detecting commands that change the state of the rendering device, and requesting modification of a state of the communication session between the reading terminal and the first control device on the basis of the obtained item of data.

* * * * *